US006045110A

United States Patent [19]

Kulp et al.

[11] Patent Number: 6,045,110

[45] Date of Patent: Apr. 4, 2000

[54] FLAG HOLDER

[75] Inventors: Jack H. Kulp, San Juan Capistrano, Calif.; John D. McKenney, Arroyo Seco, N.Mex.

[73] Assignee: Trafix Devices, Inc., San Clemente, Calif.

[21] Appl. No.: 08/918,976

[22] Filed: Aug. 27, 1997

Related U.S. Application Data

[63] Continuation-in-part of application No. 08/564,662, Nov. 29, 1995.

[51] Int. Cl.[7] .................... A01K 97/10

[52] U.S. Cl. .................... 248/534; 248/218.4

[58] Field of Search .................... 248/218.4, 219.2, 248/219.3, 279.2, 473, 469, 539, 512, 536, 513, 534, 518, 519, 221.11, 222.11, 222.13; 403/256–385, 391, 389; 40/612, 607, 610, 611; 116/173, 63 R, 63 P

[56] References Cited

U.S. PATENT DOCUMENTS

| | | | |
|---|---|---|---|
| 4,309,836 | 1/1982 | Kanpp | 40/602 |
| 4,426,800 | 1/1984 | Brown | 40/606 |
| 4,433,935 | 2/1984 | Main et al. | 403/385 |
| 4,509,714 | 4/1985 | Seely | 248/618 |
| 4,592,158 | 6/1986 | Seely | 40/603 |
| 4,619,220 | 10/1986 | Seely et al. | 116/63 P |
| 4,980,984 | 1/1991 | Kulp et al. | 40/610 |
| 5,438,782 | 8/1995 | Belobraydich et al. | 40/610 |
| 5,472,162 | 12/1995 | Mason | 248/121 |
| 5,829,178 | 11/1998 | Hillstrom | 40/610 |

*Primary Examiner*—Ramon O. Ramirez
*Assistant Examiner*—Gwendolyn Baxter
*Attorney, Agent, or Firm*—Stout, Uxa, Buyan & Mullins, LLP; Donald E. Stout

[57] ABSTRACT

A flag holder includes a flag arm bracket having a generally U-shaped body with two opposing edges. The U-shaped body wraps around a frame member, such as a reinforcing batten, of the highway sign, to thereby align the flag arm bracket with the frame member. An aperture in the flag arm bracket accommodates a shaft, such as a bolt. The shaft passes through both the aperture of the flag arm bracket and also through an aperture in the frame member of the highway sign. The bolt secures the flag arm bracket to the frame member, and the flag arm bracket holds at least one flag arm to the flag arm bracket.

38 Claims, 3 Drawing Sheets

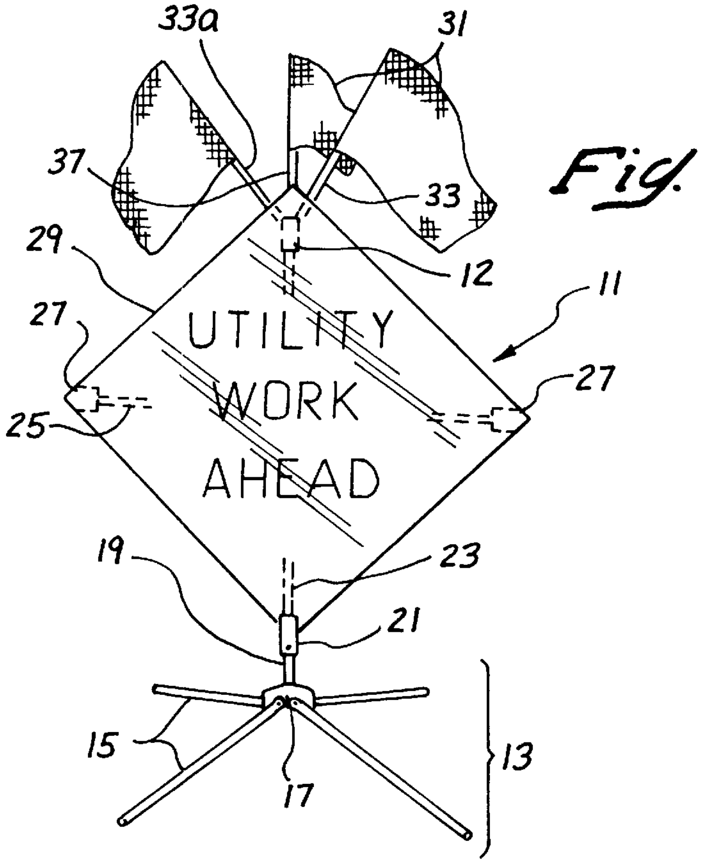
Fig. 1
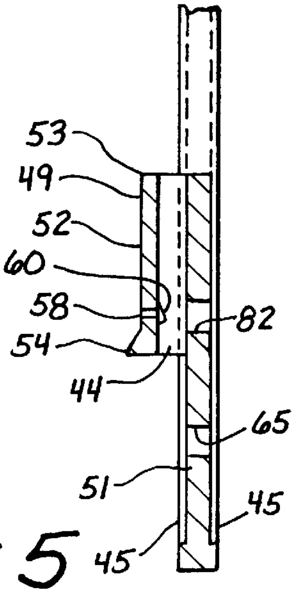
Fig. 5
Fig. 9a
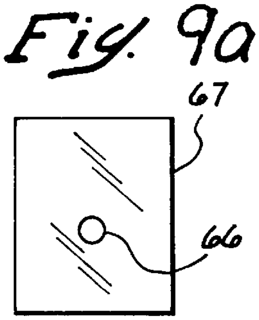
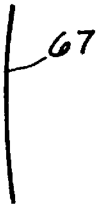
Fig. 9b
Fig. 10a
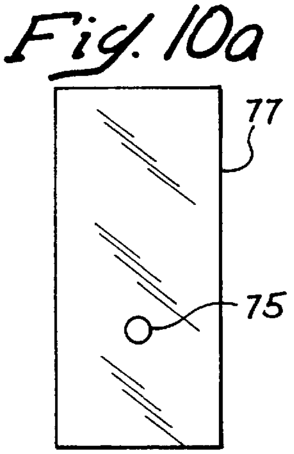
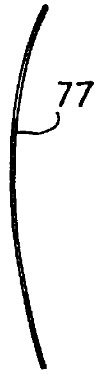
Fig. 10b

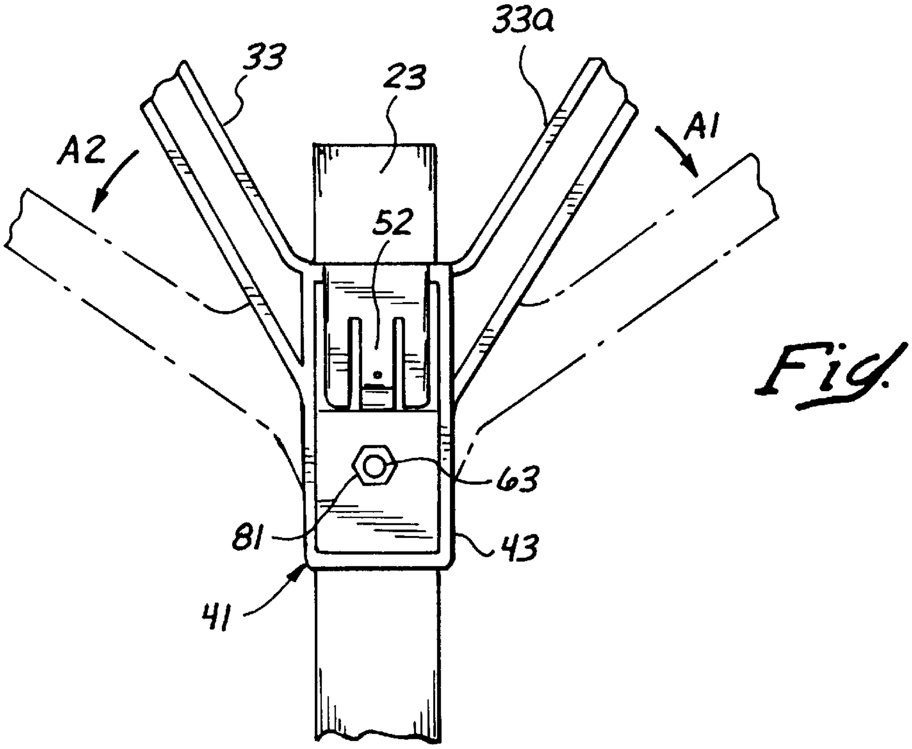
Fig. 6
Fig. 4
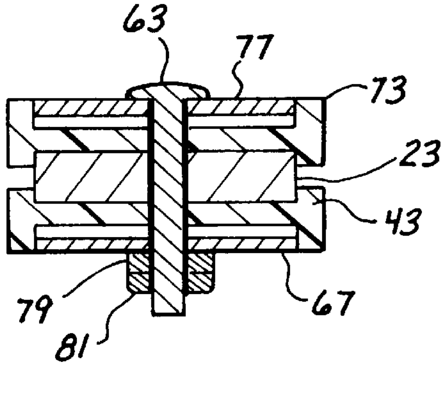
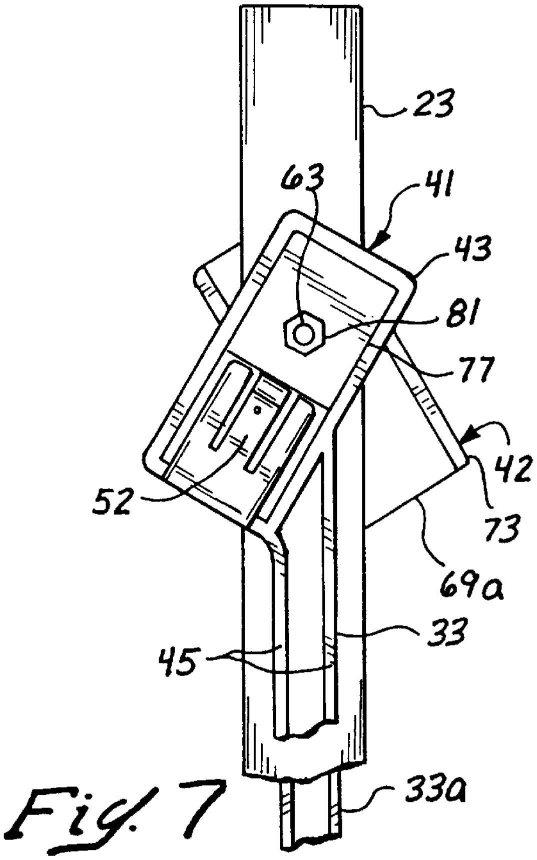
Fig. 7

FLAG HOLDER

This application is a continuation-in-part of co-pending U.S. application Ser. No. 08/564,662, filed Nov. 29, 1995 pending and entitled Flag Holder, which is commonly assigned and the contents of which are expressly incorporated herein by reference.

FIELD OF THE INVENTION

The present invention relates generally to highway signs and, more particularly, to assemblies for connecting warning flags to highway signs.

BACKGROUND OF THE INVENTION

Highway signs are generally used for promoting the safe passage of motor vehicles and/or pedestrians by advising of, for example, approaching unsafe driving conditions. These highway signs are generally provided with various highway legends, and are generally configured to flex in response to prevailing winds and wind gusts created by motor vehicles and the like.

Conventional highway signs are generally colored brightly to attract the attention of passersby. Additionally, these highway signs are commonly provided with warning flags secured thereto for flapping in the wind and for drawing additional attention of motorists to the legend on the highway sign.

A flexible, lightweight highway sign allows for convenient transportation and storage of the sign. Such a sign may have reinforcing battens for holding the sign in a message display position. These reinforcing battens are conventionally constructed of flexible, lightweight plastic materials. U.S. Pat. No. 4,426,800 discloses structure for mounting a highway sign using reinforcing battens and a stand. Warning flags are conventionally mounted on highway signs with flag arms, which are generally constructed of lightweight, flexible plastic. These warning flags enhance the visibility of the highway signs and give advance warning to motorists at a greater distance. U.S. Pat. No. 4,980,984 discloses a clamping member for attaching flag arms to a reinforcing batten of a highway sign. The clamping member disclosed in this patent, however, while providing excellent functionality, is somewhat complex in design and relatively expensive to manufacture. A need exists in the prior art for clamping members of simple, lightweight, and inexpensive design, for efficiently securing flag arms to highway signs.

SUMMARY OF THE INVENTION

The flag holders of the present invention are simple in design and relatively inexpensive to manufacture. These flag holders secure flag arms to reinforcing battens of highway signs without unnecessary bulk, weight, and complexity. According to one broad aspect of the present invention, a flag holder includes a flag arm bracket having a generally U-shaped body with two opposing edges. The U-shaped body wraps around a frame member, such as a reinforcing batten, of the highway sign, to thereby align the flag arm bracket with the frame member. The flag arm bracket further includes a flag arm. An aperture in the flag arm bracket accommodates a shaft, such as a bolt. The shaft passes through both the aperture of the flag arm bracket and also through an aperture in the frame member of the highway sign. The bolt secures the flag arm bracket to the frame member.

The attachment portion of the flag arm bracket may include a sleeve for accommodating a corresponding flag arm. The bolt fits through the sleeve and through an aperture in the flag arm, to thereby prevent the flag arm from passing too far through the sleeve. The sleeve is oriented to hold the flag arm at either a thirty or forty-five degree angle, relative to the vertical reinforcing batten.

The flag arm bracket according to one aspect of the present invention is adapted to removably secure a warning flag arm to a highway sign. The flag arm bracket includes an arm-receiving aperture disposed in the flag arm bracket and a finger member. The arm-receiving aperture includes a proximal end, a distal end, and an axis extending between the proximal end and the distal end. The arm-receiving aperture is adapted to accommodate a warning flag arm therein, and the finger member is adapted to releasably engage a portion of the warning flag arm when the warning flag arm is inserted into the arm-receiving aperture. The finger member is adapted to be moved between an engaged position where the finger member engages the warning flag arm, and a released position where the finger member does not engage the warning flag arm. The finger member is biased to the engaged position, and is adapted to be moved by a hand of a user from the engaged position to the released position. A proximal finger end of the finger member is secured to the flag arm bracket, and a distal finger end of the finger member is movable between the engaged position and the released position. The thickness of the distal finger end is greater than the thickness of the proximal finger end, to thereby facilitate gripping of the distal finger end by the hand of a user.

According to one broad aspect of the present invention, a detent protrudes from the distal finger end. The detent engages the warning flag arm when the distal finger end is moved to the engaged position, and releases the warning flag arm when the finger member is moved to the released position. The finger member comprises a pin aperture, and the detent comprises a pin which is adapted to fit within the pin aperture. The pin is made of metal, and the pin is press fit and glued into the pin aperture. When the pin is secured in the pin aperture, the pin extends into an arm aperture disposed on the warning flag arm. The pin comprises a first end and a second protruding end, and the second protruding end has a diameter which is greater than a diameter of the first end. The pin further includes a proximal side and a distal side, and the distal side extends further away from the finger member than the proximal side. The second protruding end of the pin is adapted to fit within the arm aperture of the warning flag arm.

According to another aspect of the present invention, a flag arm bracket includes a clamping portion, a first aperture disposed through the clamping portion, a rectangularly-shaped ridge disposed on one of the surfaces of the clamping portion, a rectangularly-shaped leaf spring, and a second aperture disposed through the rectangularly-shaped leaf spring. The clamping portion is adapted to secure the flag arm bracket to the flag member, and the first aperture is adapted to accommodate a shaft therethrough to thereby secure the clamping portion to the flag member. The rectangularly-shaped leaf spring is adapted to snugly fit within a rectangularly-shaped recessed area formed on a surface of the clamping portion by the rectangularly-shaped ridge. The second aperture has a diameter which is substantially equal to a diameter of the first aperture, to thereby facilitate placement of a shaft through both the first aperture, the second aperture, and a third aperture disposed in the frame member.

According to yet another aspect of the present invention, the flag arm bracket includes an engagement assembly adapted to releasably engage a portion of a warning flag arm when the warning flag arm is placed into contact with the engagement assembly. The engagement assembly is adapted to be moved between an engage mode where the engagement assembly engages the warning flag arm and a release mode where the engagement assembly does not engage the warning flag arm. The engagement assembly is further adapted to be contacted by a user and moved from the engage mode to the release mode. The engagement assembly further includes a rectangular leaf spring having a spring aperture, an engagement assembly body, and a body aperture disposed within the engagement assembly body. The spring aperture and the body aperture together are adapted to accommodate a shaft therethrough to thereby secure the flag arm bracket to the frame member. The engagement assembly body includes a finger member having a proximal finger end which is secured to the flag arm bracket and a distal finger end which is moveable between the engage mode and the release mode. The distal finger end is thicker than the proximal finger end, and the distal finger end is adapted to be moved in a direction away from the engagement assembly body to thereby move the finger member from the engage mode to the release mode.

The present invention, together with additional features and advantages thereof, may best be understood by reference to the following description taken in connection with the accompanying illustrative drawings.

BRIEF DESCRIPTION OF THE DRAWINGS

FIG. 1 is a front elevational view of the flag arm bracket assembly of the present invention, securing three warning flags to a highway sign;

FIG. 4 is a first cross-sectional view of the flag arm bracket assembly shown in FIG. 2;

FIG. 5 is a second cross-sectional view of the flag arm bracket assembly shown in FIG. 2;

FIG. 6 is a front elevational view showing movement directions of the flag arm bracket assembly of the presently preferred embodiment;

FIG. 7 is a front elevational view showing the flag arm bracket assembly of the presently preferred embodiment in a storage configuration;

FIG. 9*a* is a front elevational view of a first leaf spring, according to the presently preferred embodiment;

FIG. 9*b* is a cross-sectional view of the leaf spring of FIG. 9*a;*

FIG. 10*a* is a front elevational view of a second leaf spring, according to the presently preferred embodiment; and FIG. 10*b* is a side elevational view of the leaf spring of FIG. 10*a*.

DETAILED DESCRIPTION OF THE PREFERRED EMBODIMENTS

Figure 8:
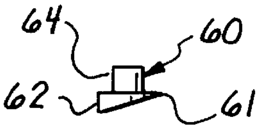
FIG. 8 is a side elevational view of a pin, according to the presently preferred embodiment.

FIG. 1 shows the flag arm bracket assembly 12 of the present invention. The flag arm bracket assembly 12 is shown connected to a highway sign 11. Two side flag arms 33, 33*a* and one center flag arm 34 are connected by the flag arm bracket assembly 12 to the highway sign 11. Warning flags 31 are attached to each of the flag arms 33, 33*a*, 34.

The highway sign 11 comprises a sign stand 13 having legs 15, a base 17, and a stem 19. The sign stand 13 may be readily folded for transport and unfolded for mounting of the highway sign 11 thereon. In one preferred embodiment, the stem 19 of the sign stand 13 can be connected to the bottom pocket and connector 21 of the highway sign 11 to thereby mount the highway sign 11 in an upright configuration.

The highway sign 11 comprises a flexible material 29, which comprises a highway safety legend of a preselected type on one side thereof. A vertical reinforcing batten 23 fits into the bottom pocket and the connector 21 at one end and into the flag arm bracket assembly 12 and a top pocket (not shown) at the other end thereof. A horizontal reinforcing batten 25 fits into two corner pockets 27 of the highway sign 11. The vertical reinforcing batten 23 and the horizontal reinforcing batten 25 preferably comprise a flexible material that will allow the highway sign 11 to respond to wind or gusts impinging thereon by bending, without breaking or tipping over. These reinforcing battens 23, 25 may comprise, for example, glass reinforced polyester, plastic pultrusions that are commercially available. The flexible material 29 of the highway sign 11 preferably comprises a lightweight, flexible material, such as reflective vinyl plastic and a fluorescent mesh that allows the sign to be readily rolled up, and in this condition, keeps the sign faces and legends in good working order.

Figure 2:
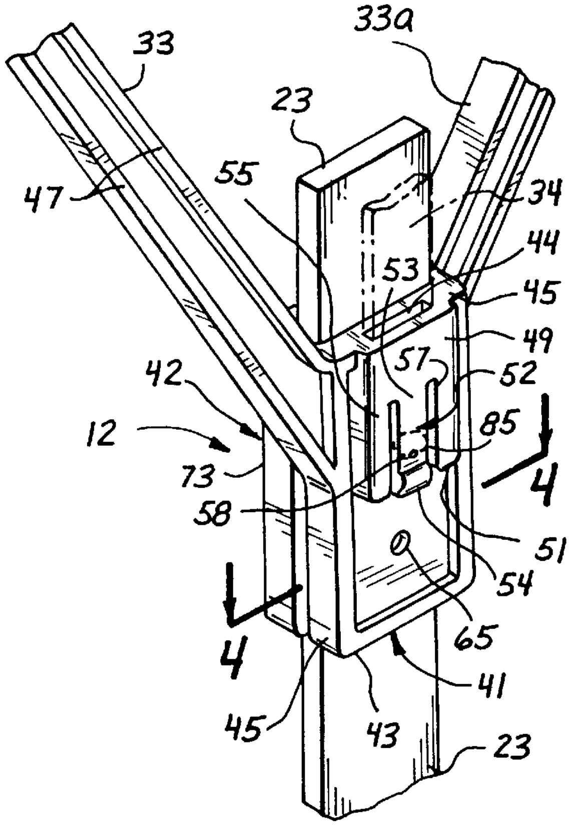
FIG. 2 is a perspective view illustrating the flag arm bracket assembly of the presently preferred embodiment secured to a vertical reinforcing batten of the highway sign.

FIG. 2 is a perspective view of the presently preferred embodiment of the flag arm bracket assembly 12 attached to the vertical reinforcing batten 23. The flag arm bracket assembly 12 comprises two flag arm brackets 41, 42 each of which includes a respective clamping portion 43, 73 and a flag arm 33, 33*a*. Each of the clamping portions 43, 73 is preferably integrally molded with a corresponding one of the flag arms 33, 33*a*. As presently embodied, each of the integrally molded flag arm brackets 41, 42 is injection molded, using a glass-filled plastic, for example. The flag arm 33, for example, comprises ribs 47 for added strength. A warning flag 31 (FIG. 1) may be attached to each of the flag arms 33, 33*a*, either at manufacture, or by the user on site.

The clamping portions 43, 73 of the flag arm brackets 41, 42 are configured to snugly fit against the vertical reinforcing batten 23. In the presently preferred embodiment, the vertical reinforcing batten 23 has a rectangular cross section, and each of the clamping portions 43, 73 comprises two lips for fitting around a side of the vertical reinforcing batten 23. The two lips 45 of the clamping portion 43, for example, prevent the clamping portion 43 from rotating due to torque exerted by a corresponding flag arm 33, or from other forces such as wind.

In addition to having an integrally molded flag arm 33, the clamping portion 43 of the flag arm bracket 41, for example, further comprises a rectangular aperture 44 for optionally receiving a rectangular center flag arm 34 (FIG. 1). The rectangular aperture 44 is defined between a raised portion 49 and a recessed portion 51. The raised portion 49 of the clamping portion 43 comprises a finger member 52 having a proximal end 53 which is integrally molded with the raised portion 49, and a distal end 54, which preferably comprises an enhanced thickness to facilitate gripping by the hand of a user. Two slots 55 and 57 within the raised portion 49 define the finger member 52, and allow the distal end 54 to slightly pivot about the proximal end 53.

Figure 3:
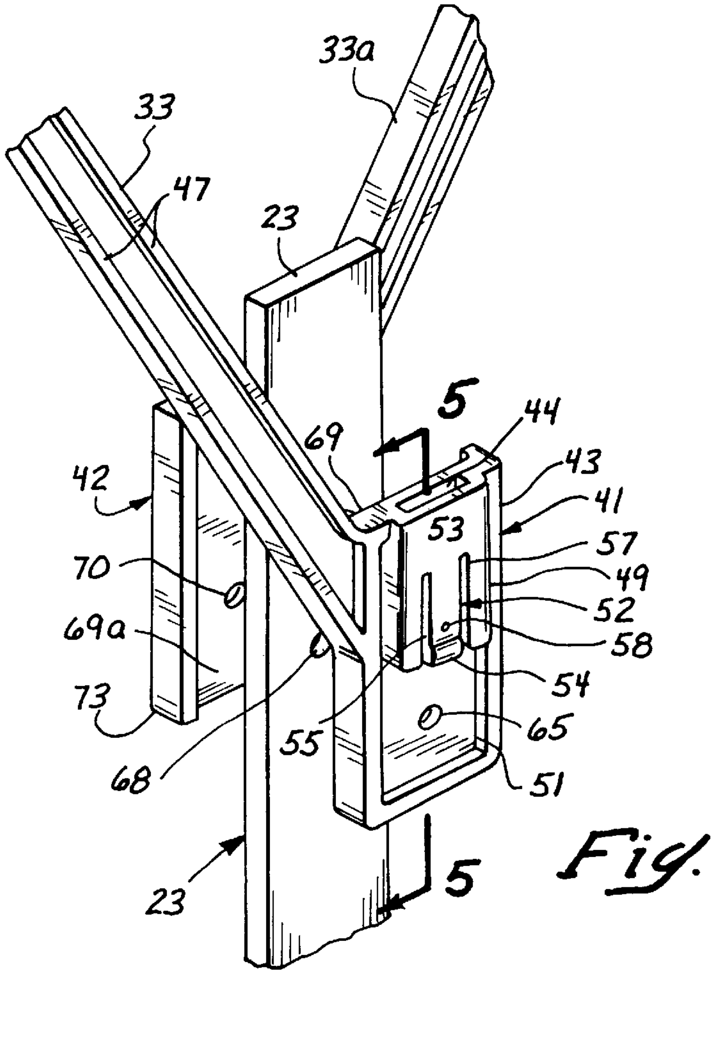
FIG. 3 is an exploded view of the flag arm bracket assembly shown in FIG. 2.

FIG. 3 is an exploded view of the flag arm bracket assembly 12 shown in FIG. 2, and FIG. 5 illustrates a cross-sectional view of the flag arm bracket assembly 12, taken along the line 5—5 of FIG. 3. The thickness of the distal end 54 of the finger member 52 is greater than the thickness of the proximal end 53 of the finger member 52. A pin aperture 58 facilitates placement of a pin 60 (FIGS. 5 and 8) therethrough. The pin 60 comprises a proximal side 61 and a distal side 62. The thickness of the distal side 62 is greater than the thickness of the proximal side 61, and the distal side 62 preferably extends into the rectangular aperture 44 and points toward the distal end 54 of the finger member 52. The shaft 64 of the pin 60 is first inserted through the aperture 82, and is then preferably press fit and glued within the pin aperture 58 of the finger member 52. When a warning flag arm is inserted into the rectangular aperture 44, the proximal side 61 of the pin 60 slides over the surface of the warning flag arm until the distal side 62 of the pin 60 fits into an aperture (not shown) of the warning flat arm. The fitting of the distal side 62 of the pin 60 into the aperture secures the warning flag arm within the rectangular aperture 44. A user can grip the distal end 54 of the finger member 52 and pivot the finger member 52 away from the warning flag arm, to thereby withdraw the distal side 62 of the pin 60 from within the aperture of the warning flag arm. Once the distal side 62 of the pin 60 is withdrawn from within the aperture of the warning flag arm, the warning flag arm can be removed from within the rectangular aperture 44.

As illustrated in FIG. 3, the recessed portion 51 of the clamping portion 43 includes an aperture 65. The vertical reinforcing batten 23 also includes an aperture 68 for accommodating a shaft 63 (FIG. 4). The shaft 63 is inserted through a first aperture 65 of a first leaf spring 67 (FIG. 9), the aperture 65 of the clamping portion 43, the aperture 68 of the vertical reinforcing batten 23, the aperture 70 of a second clamping portion 73, and a second aperture 75 of a second leaf spring 77 (FIG. 10). The second clamping portion 73 preferably does not comprise a rectangular aperture and a raised portion for accommodating a vertical warning flag arm. Alternatively, such a configuration may be manufactured, according to preference, to support an additional warning flag arm. In the presently preferred embodiment, the second leaf spring 77, having a greater length than the first leaf spring 67, is used with the second clamping portion 73, since an enlarged recessed portion is formed due to the absence of any raised portion.

The cross-sectional view of FIG. 4 illustrates a shaft 63 secured through the second leaf spring 77, the second clamping portion 73, the vertical reinforcing batten 23, the clamping portion 43, the first leaf spring 67, and two lock nuts 79, 81. The shaft 63 preferably comprises a "Number 10" screw having a Phillips pan head. The first leaf spring 67 and the second leaf spring 77 allow the two corresponding clamping portions 43, 73 to move toward and away from the vertical reinforcing batten 23. When one of the leaf springs 67, 77 is compressed, a corresponding one of the clamping portions 43, 73 can be slightly moved away from the surface of the vertical reinforcing batten 23. When the leaf spring 67, for example, is in a slightly expanded position, the two lips 45 of the clamping portion 43 fit around two corresponding sides of the vertical reinforcing batten 23 to thereby allow the inner channel 69 (FIG. 3) of the clamping portion 43 to contact three surfaces of the vertical reinforcing batten 23. In other words, when a flag arm bracket 41 is rotated about the shaft 63 into an orientation out of alignment with the vertical reinforcing batten 23, the corresponding leaf spring is slightly compressed.

FIGS. 9*a* and 10*a* illustrate top planar views of the first leaf spring 67 and the second leaf spring 77, respectively, and FIGS. 9*b* and 10*b* illustrate side elevational views of the first leaf spring 67 and the second leaf spring 77, respectively. The leaf springs 67, 77, in combination with the lips of the clamping portions 43, 73, provide a locking fit between the clamping portions 43, 73 and the vertical reinforcing batten 23.

FIG. 6 illustrates the two flag arm brackets 41, 42 in their locked positions, where the inner channels 69, 69*a* of each of the clamping portions 43, 73 contact opposing surfaces of the vertical reinforcing batten 23. In the presently preferred embodiment, this locked position holds the respective flag arms 33, 33*a* at angles of either thirty or forty-five degrees, depending on preference, relative to the vertical reinforcing batten 23. The two flag arm brackets 41, 42 may be rotated in the directions of arrows Al and A2, respectively, to move the two flag arm brackets 41, 42 into the position shown in FIG. 7. In FIG. 7, each of the flag arms 33, 33*a* is parallel to the vertical reinforcing batten 23 to thereby allow for a compact storage of the vertical reinforcing batten 23 and the two flag arm brackets 41, 42. Alternatively, the two flag arm brackets 41, 42 may be separated from the vertical reinforcing batten 23 for storage.

Although exemplary embodiments of the invention have been shown and described, many other changes, modifications and substitutions, in addition to those set forth in the above paragraph, may be made by one having ordinary skill in the art without necessarily departing from the spirit and scope of this invention.

We claim:

1. A flag arm bracket adapted to removably secure a waning flag arm to a highway sign having at least a single frame member, the flag arm bracket comprising:

an arm-receiving aperture disposed in the flag arm bracket, the arm-receiving aperture having a proximal end, a distal end, and an axis extending between the proximal end and the distal end, the arm-receiving aperture being adapted to accommodate the warning flag arm therein; and an elongate finger member adapted to releasably engage a portion of the warning flag arm when the warning flag arm is inserted into the arm-receiving aperture, the elongate finger member having a proximal finger end, a distal finger end and a longitudinal axis extending along a length of the elongate finger member between the proximal and distal finger ends, the longitudinal axis being oriented substantially parallel to the axis of the arm-receiving aperture, and the elongate finger member being adapted to be moved between an engage position where the elongate finger member engages the warning flag arm and a release position where the elongate finger member does not engage the warning flag arm, the elongate finger member further being adapted to be moved by a hand of a user from the engage position to the release position.

2. The flag arm bracket as recited in claim 1, the elongate finger member being biased to the engage position.

3. The flag arm bracket as recited in claim 2, the proximal finger end being secured to the flag arm bracket and the distal finger end being movable between the engage position and the release position.

4. The flag arm bracket as recited in claim 3, the distal finger end having a thickness which is greater than a thickness of the proximal finger end.

5. The flag arm bracket as recited in claim 3, the proximal finger end being integrally molded with the flag arm bracket.

6. The flag arm bracket as recited in claim 3, the elongate finger member comprising a detent protruding from the elongate finger member, the detent being adapted to engage the warning flag arm when the elongate finger member is moved to the engage position and being adapted to release the warning flag arm when the elongate finger member is moved to the release position.

7. The flag arm bracket as recited in claim 6, the elongate finger member comprising a pin aperture, and the detent comprising a pin which is adapted to fit within the pin aperture.

8. The flag arm bracket as recited in claim 7, the detent protruding from the elongate finger member into the arm-receiving aperture.

9. The flag arm bracket as recited in claim 7, the pin comprising metal, and the pin being press fitted and glued into the pin aperture.

10. The flag arm bracket as recited in claim 7, the pin further being adapted to fit within an arm aperture disposed on the warning flag arm.

11. The flag arm bracket as recited in claim 10, the pin comprising a first end and a second protruding end, the second protruding end having a diameter which is greater than a diameter of the first end.

12. The flag arm bracket as recited in claim 11, the second protruding end further comprising a proximal side and a distal side, the proximal side extending a first distance from the elongate finger member when the pin is disposed within the arm aperture, the distal side extending a second distance from the elongate finger member, the first distance being less than the second distance, and the second protruding end being adapted to fit within the arm aperture on the warning flag arm, the arm aperture having a diameter which is greater than the diameter of the second protruding end.

13. The flag arm bracket as recited in claim 6, the detent being adapted to fit within an arm aperture disposed on the warning flag arm.

14. The flag arm bracket as recited in claim 13, the detent having a proximal side and a distal side, the proximal side extending a first distance from the elongate finger member, and the distal side extending a second distance from the elongate finger member, the first distance being less than the second distance.

15. The flag arm bracket as recited in claim 14, the detent protruding from the elongate finger member into the arm-receiving aperture.

16. A flag arm bracket adapted to be secured to a frame member of a highway sign, the flag arm bracket comprising:

a clamping portion having a generally planar configuration defined between two opposing surfaces, the clamping portion being adapted to secure the flag arm bracket to the frame member;

a first aperture disposed through the clamping portion and connecting the two opposing surfaces, the first aperture being adapted to accommodate a shaft therethrough to thereby facilitate securing of the clamping portion to the frame member;

a ridge disposed on one of the two opposing surfaces, the ridge defining a recessed area;

a leaf spring adapted to snugly fit within the recessed area; and a second aperture disposed through the leaf spring, the second aperture having a diameter which is substantially equal to a diameter of the first aperture, whereby a shaft can be secured through the first aperture, the second aperture, and a third aperture disposed in the frame member to thereby facilitate securing of the flag arm bracket to the frame member.

17. A flag arm bracket adapted to removably secure a warning flag arm to a highway sign having at least a single frame member, the flag arm bracket comprising an engagement assembly adapted to releasably engage a portion of a warning flag arm when the warning flag arm is placed into contact with the engagement assembly, the engagement assembly being adapted to be bent, while engaging the single frame member, between an engage mode where the engagement assembly is adapted to engage the warning flag arm and a release mode where the engagement assembly is not adapted to engage the warning flag arm, the engagement assembly further being adapted to be contacted by a user and bent from the engage mode to the release mode.

18. The flag arm bracket as recited in claim 17, the engagement assembly comprising:

a leaf spring having a leaf spring aperture; and a body aperture disposed within the engagement assembly, the leaf spring aperture and the body aperture together being adapted to accommodate a shaft therethrough to thereby secure the flag arm bracket to the frame member.

19. The flag arm bracket as recited in claim 17, the engagement assembly comprising a finger member, the finger member having a proximal finger end which is secured to the flag arm bracket and a distal finger end which is movable between the engage mode and the release mode, and the distal finger end having a thickness which is greater than a thickness of the proximal finger end.

20. The flag arm bracket as recited in claim 19, the distal finger end being adapted to be bent in a direction away from the engagement assembly to thereby move the finger member from the engage mode to the release mode.

21. The flag arm bracket as recited in claim 20, the engagement assembly comprising:

a leaf spring having a leaf spring aperture; and an engagement-assembly aperture disposed in the engagement assembly, the leaf spring aperture and the engagement-assembly aperture together being adapted to accommodate a shaft therethrough to thereby secure the flag arm bracket to the frame member.

22. A flag arm bracket adapted to removably secure a warning flag arm to a highway sign while the flag arm bracket is connected to the highway sign, the flag arm bracket comprising:

an arm-receiving aperture disposed in the flag arm bracket, the arm-receiving aperture having a proximal end, a distal end, and an axis extending between the proximal end and the distal end, the arm-receiving aperture being adapted to accommodate the warning flag arm therein while the flag arm bracket is connected to the highway sign; and a pivotal finger member adapted to releasably engage a portion of the warning flag arm when the warning flag arm is inserted into the arm-receiving aperture, the pivotal finger member being adapted to be pivoted between an engage position where the pivotal finger member engages the warning flag arm and a release position where the pivotal finger member does not engage the warning flag arm, the pivotal finger member further being adapted to be pivoted by a hand of a user from the engage position to the release position.

23. The flag arm bracket as recited in claim 22, the pivotal finger member being biased to the engage position.

24. The flag arm bracket as recited in claim 23, the proximal finger end being adapted to be secured to the flag arm bracket and the distal finger end being adapted to be pivoted between the engage position and the release position.

25. The flag arm bracket as recited in claim 24, the distal finger end having a thickness which is greater than a thickness of the proximal finger end.

26. The flag arm bracket as recited in claim 24, the proximal finger end being integrally molded with the flag arm bracket.

27. The flag arm bracket as recited in claim 24, the pivotal finger member comprising a detent protruding from the pivotal finger member, the detent engaging the warning flag arm when the pivotal finger member is pivoted to the engage position and releasing the warning flag arm when the pivotal finger member is pivoted to the release position.

28. The flag arm bracket as recited in claim 27, the pivotal finger member comprising a pin aperture, and the detent comprising a pin which is adapted to fit within the pin aperture.

29. The flag arm bracket as recited in claim 28, the detent protruding from the pivotal finger member into the arm-receiving aperture.

30. The flag arm bracket as recited in claim 28, the pin comprising metal, and the pin being press fitted and glued into the pin aperture.

31. The flag arm bracket as recited in claim 28, the pin further being adapted to fit within an arm aperture disposed on the warning flag arm.

32. The flag arm bracket as recited in claim 31, the pin comprising a first end and a second protruding end, the second protruding end having a diameter which is greater than a diameter of the first end.

33. The flag arm bracket as recited in claim 32, the second protruding end further comprising a proximal side and a distal side, the proximal side extending a first distance from the pivotal finger member when the pin is disposed within the arm aperture, the distal side extending a second distance from the pivotal finger member, the first distance being less than the second distance, and the second protruding end being adapted to fit within the arm aperture on the warning flag arm, the arm aperture having a diameter which is greater than the diameter of the second protruding end.

34. The flag arm bracket as recited in claim 27, the detent being adapted to fit within an arm aperture disposed on the warning flag arm.

35. The flag arm bracket as recited in claim 34, the detent having a proximal side and a distal side, the proximal side extending a first distance from the pivotal finger member, and the distal side extending a second distance from the pivotal finger member, the first distance being less than the second distance.

36. The flag arm bracket as recited in claim 35, the detent protruding from the pivotal finger member into the arm-receiving aperture.

37. A flag arm bracket adapted to removably secure a warning flag arm to a highway sign having a reinforcing bracket, the flag arm bracket comprising a first engagement assembly adapted to releasably engage the reinforcing bracket of the highway sign, and flag arm bracket further comprising a second engagement assembly adapted to be moved between an engage mode and a release mode while the first engagement assembly is engaged with the reinforcing bracket, wherein the second engagement assembly is adapted to engage the vertical reinforcing bracket of the warning flag arm in the engage mode and is adapted to be released from engagement with the reinforcing bracket of the warning flag arm in the release mode, the second engagement assembly further being adapted to be contacted by a user and moved from the engage mode to the release mode.

38. A flag arm bracket adapted to removably secure a warning flag arm to a highway sign the highway sign having at least a single frame member, the flag arm bracket comprising an integrally molded, non-metallic engagement assembly adapted to releasably engage a portion of a warning flag arm when the warning flag arm is placed into contact with the integrally molded, non-metallic engagement assembly, the integrally molded, non-metallic engagement assembly being adapted to be moved, while engaging the single frame member of the highway sign, between an engage mode where the engagement assembly is adapted to engage the warning flag arm and a release mode where the engagement assembly is not adapted to engage the warning flag arm, the integrally molded, non-metallic engagement assembly further being adapted to be contacted by a user and moved from the engage mode to the release mode.

* * * * *